United States Patent
Al-Anzi

(10) Patent No.: US 8,668,187 B2
(45) Date of Patent: Mar. 11, 2014

(54) INTEGRATED AERATION SYSTEM

(75) Inventor: Bader Shafaqa Al-Anzi, Abdullah Al Mubarak (KW)

(73) Assignee: Kuwait University, Safat (KW)

(*) Notice: Subject to any disclaimer, the term of this patent is extended or adjusted under 35 U.S.C. 154(b) by 328 days.

(21) Appl. No.: 13/303,024

(22) Filed: Nov. 22, 2011

(65) Prior Publication Data
US 2013/0127072 A1    May 23, 2013

(51) Int. Cl.
*B01F 3/04*    (2006.01)
(52) U.S. Cl.
USPC ....... 261/76; 261/116; 261/119.1; 261/121.1; 261/126
(58) Field of Classification Search
USPC ............. 261/76, 115, 116, 119.1, 121.1, 126, 261/DIG. 75
See application file for complete search history.

(56) References Cited

U.S. PATENT DOCUMENTS

| | | | |
|---|---|---|---|
| 2,771,416 A | 11/1956 | Ryan | |
| 6,017,020 A | 1/2000 | Baughman et al. | |
| 6,080,306 A | 6/2000 | Falkner | |
| 6,942,801 B2 * | 9/2005 | Nishimura | 210/622 |
| 7,294,278 B2 | 11/2007 | Spears et al. | |
| 7,875,180 B2 | 1/2011 | Fry et al. | |
| 2010/0012581 A1 | 1/2010 | Singer et al. | |

* cited by examiner

*Primary Examiner* — Robert A Hopkins
(74) *Attorney, Agent, or Firm* — Richard C. Litman

(57) ABSTRACT

The integrated aeration system utilizes a water pump for aeration. Ambient air/gas is entrained by a circulating water jet induced by the pump. The circulating water jet enters a sealed tank. The entrained gas is broken into bubbles after the impingement between the jet and a receiving pool occurs, aerating the receiving pool by water jet spray. The entrained gas/air builds up headspace pressure above the water pool, the headspace pressure being measured by a pressure gauge. The trapped air above the water pool is released when the headspace pressure increases to reach a desired value to aerate a separate tank/container as a diffused aeration or any other aeration process.

3 Claims, 1 Drawing Sheet

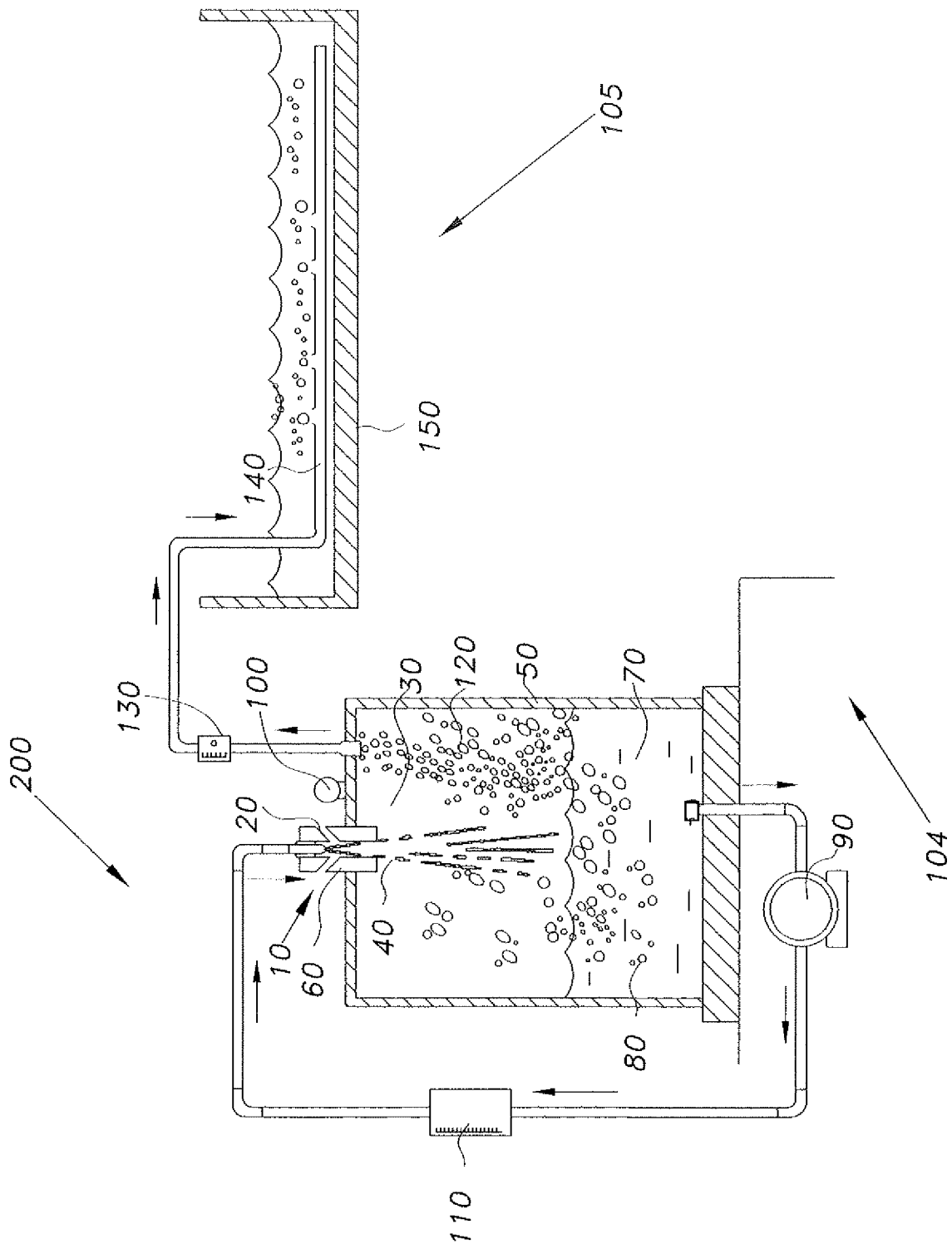

INTEGRATED AERATION SYSTEM

BACKGROUND OF THE INVENTION

1. Field of the Invention

The present invention relates to aeration systems, and particularly to an integrated aeration system utilizing a water pump.

2. Description of the Related Art

Aeration is one of the processes employed in various air-water contactors, such as an aquarium, flotation devices, biological treatment in wastewater, etc. In a wastewater process, air is introduced in the secondary stage (biological) using convectional technologies to increase the concentration of Dissolved Oxygen DO (usually 2.0 ppm) needed for the bacteria to breath and consume the organic compounds. Presently, diffused aeration is used to introduce air to the system under high pressure from the bottom of the basin (clarifier) through pores in a pipe network utilizing compressors.

However, this type of technology is costly because it requires an extra cost to operate air compressors that provide pressurized gas/air. Other aeration processes include mechanical aeration utilizing impellers and plunging liquid jets. However, mechanical aeration isn't efficient and consumes high energy. Similarly, in plunging jets, the aeration is limited to the nearby liquid, and the bubble sizes can't be controlled.

Certain environmental problems, such as contamination of seawater by wastewater, require efficient and immediate aeration because this contamination will ultimately lead to oxygen depletion, and consequently will destroy the aquatic life (e.g., the fish kill phenomenon) unless dissolved oxygen is restored quickly. In this case, an aeration technology is required to promote aeration phenomena and increase dissolved oxygen concentration (DO) into water immediately. Not only this, but also aerators can be used to remove unwanted gases from the atmosphere to dissolve them into water. However, most of the existing aerators consume a lot of energy with limited aeration due to the use of compressors for diffused aeration and propellers for mechanical aeration. Hence, all of these processes appear to be costly, not very efficient, and fixed (not portable). In addition, conventional aeration systems are recognized as being considerably burdensome in their maintenance and management. This has encouraged researchers to seek an alternative system that provides efficient oxygen transfer at a lower cost.

Thus, an integrated aeration system solving the aforementioned problems is desired.

SUMMARY OF THE INVENTION

The integrated aeration system utilizes a water pump for aeration. Ambient air/gas is entrained by a circulating water jet induced by the pump. The circulating water jet enters a sealed tank. The entrained gas is broken into bubbles after the impingement between the jet and a receiving pool occurs. The entrained gas/air builds up headspace pressure above the water pool, the headspace pressure being measured by a pressure gauge.

The trapped air above the water pool is released when the headspace pressure increases to reach a desired value to aerate a separate tank/container as a diffused aeration or any other aeration process.

These and other features of the present invention will become readily apparent upon further review of the following specification and drawings.

BRIEF DESCRIPTION OF THE DRAWINGS

The sole drawing FIGURE is a diagrammatic side view in section of an integrated aeration system according to the present invention.

DETAILED DESCRIPTION OF THE PREFERRED EMBODIMENTS

Referring to the sole drawing FIGURE, the integrated aeration system 200 utilizes a water pump 90 for aeration. Ambient air/gas is entrained by a circulating water jet 40 induced by the pump 90. The circulating water jet enters a sealed, airtight tank 50. The entrained gas is broken into bubbles after impingement between the jet 40 and a receiving pool 70 occurs. The entrained gas/air builds up headspace pressure in the area 30 above the water pool 70, the headspace pressure being measured by a pressure gauge 100.

The trapped air above the water pool 70 is released when the headspace pressure increases to reach a desired value to aerate a separate tank/container 150 by diffused aeration or any other aeration process.

A water jet tank system 104 includes the water jet sealed tank 50, which comprises a bottom portion disposed on a platform and a top portion through which a downward spraying jet 40 of water is formed. The water pump 90 includes an inlet and an outlet, the inlet extending from the inside bottom portion of the water jet tank 50. The pump 90 causes water to flow from the tank 50 through the outlet circuit. The outlet circuit of the water pump 90 includes a water flow meter 110. The outlet circuit of the water pump 90, via the water flow meter 110 and conduit, feeds connected a nozzle 60 that enters the top portion of the water jet tank 50, the nozzle 60 having air bleeder passages 20. Ambient air 10 flows through the bleeder passages 20. The nozzle 60 causes a downward projecting water jet 40 to develop inside of tank portion 50 of the water jet tank system 104, the jet 40 impinging a receiving water pool 70. During this process, underwater air bubbles 80 are forced to the water surface and released as air bubbles 120, which accumulate in the headspace 30 above the pool 70 until sufficient pressure is built up inside the tank 50. The bubbles 80 penetrate to a certain depth in the pool 70 and rise back up due to a bubble terminal velocity (buoyancy). Generally speaking, a gas is sparingly soluble in water, and hence only a little oxygen (in ease of aeration) is transferred to the surrounding liquid (depending on operational variables). The unused (remaining) gas leaves the receiving pool 70 and is trapped in the headspace 30.

A pressure valve 100 measures pressure inside the tank 50. An outlet pipe 140 extends from inside the top portion of the water jet tank 104, flows through airflow meter 130 and ultimately includes a perforated portion disposed along a bottom portion of an open tank 150. The open tank 150 is part of an open tank system 105 that contains fluid/water to be aerated, and the perforated portion of the outlet pipe 140 accomplishes the aeration when there is sufficient pressure inside of the water jet tank 104 to cause the airflow meter valve 130 to open and allow overflow of entrained air bubbles 120 through the outlet pipe 140.

The unused (remaining or undissolved) gas leaves the receiving pool 70 to be trapped in the headspace 30 to reuse the remaining unused gas coming from the closed tank system 104, which gives more chance (detention time) for the air to contact a liquid (aeration) to increase the process efficiency, and hence save money.

The unused gas coming from the closed tank system 104 enters the open tank 150 through the air flow meter 130 and perforated pipe 140 to form the diffused aeration system 105. This process can be portable in that it needs only a tank system, pump and associated plumbing. Quick and immediate aeration is possible. The solubility of the gas is increased, and hence the efficiency of the process is increased, because the same amount of gas undergoes two processes: water jet aeration and diffused aeration. The increased process detention time (contact time between bubbles and surrounding liquid) saves money and gives better aeration. The integrated aeration system 200 can be monitored and controlled easily, does not require a compressor, and does not consume a lot of energy because only a water pump need be powered up.

It is to be understood that the present invention is not limited to the embodiments described above, but encompasses any and all embodiments within the scope of the following claims.

I claim:

1. An integrated aeration system, comprising:
    a closed water tank system including a enclosed water tank having a bottom portion adapted for holding a pool of water and a top portion sealing in air above the pool of water;
    a nozzle disposed in the top portion of the closed water tank, the nozzle having air bleeder passages allowing ambient air to flow through the nozzle and into the closed water tank;
    a headspace pressure valve disposed in the top portion of the closed water tank, the headspace pressure valve measuring headspace pressure developed inside the closed water tank;
    to a water flow meter;
    a water pump circulating water from the bottom portion of the closed water tank outside the tank through the flow meter and then through the nozzle at the top portion of the closed water tank, the nozzle entraining air through the bleeder passages into the water as the water passes through the nozzle and forming a jet spray into the pool of water in the bottom portion of the closed tank in order to aerate the pool of water in the closed water tank, head space pressure being developed in the top portion of the closed water tank when the closed water tank is partially filled with water;
    an open water tank system including an open water tank;
    an air flow valve; and
    a closed water tank air outlet pipe extending from inside the top portion of the closed water tank through the air flow valve and connecting the closed water tank system to the open water tank system, the closed water tank air outlet pipe having a perforated portion extending along a bottom inside portion of the open water tank, the perforated portion being adapted for diffusion air into a second pool of water in the open water tank system in order to aerate the second pool of water.

2. The integrated aeration system according to claim 1, wherein said ambient air flow through said nozzle is pressurized due to pressure developed by the flow of water from said water pump through the nozzle.

3. A method of aerating water, comprising the steps of:
    recirculating water from a first pool of water in a bottom portion of an enclosed, airtight tank through a water pump and into a top portion of the tank through a nozzle entraining air into the water as the water passes through the nozzle, the nozzle forming a jet spray to aerate the first pool of water in the enclosed tank by water jet aeration;
    allowing air pressure to increase in a top portion of the enclosed tank to form a head pressure; and
    releasing pressurized air from the top portion of the enclosed tank through a conduit terminating in a perforated pipe disposed in a second pool of water in an open tank in order to to aerate the second pool of water by diffusion aeration when the head pressure rises to a predetermined pressure.

* * * * *